United States Patent [19]

Moorman, Jr.

[11] 4,027,747

[45] June 7, 1977

[54] WHEELCHAIR HOLDING DEVICE FOR VEHICLES

[75] Inventor: James H. Moorman, Jr., Fort Valley, Ga.

[73] Assignee: Blue Bird Body Company (Entire), Fort Valley, Ga.

[22] Filed: Feb. 10, 1976

[21] Appl. No.: 656,888

[52] U.S. Cl. .................................. 188/28; 105/464; 188/2 F; 188/75; 248/119 R; 248/500; 280/179 R

[51] Int. Cl.² .......................................... B60T 1/04

[58] Field of Search ............. 188/2 F, 4 R, 4 B, 32, 188/28, 75; 280/179 R; 105/464, 368 B; 296/19, 65 R; 211/19, 20, 21, 5; 248/500, 505, 507, 119 R; 297/DIG. 4

[56] References Cited

UNITED STATES PATENTS

| | | | |
|---|---|---|---|
| 490,197 | 1/1893 | Grattan | 188/28 |
| 516,571 | 3/1894 | Moulton | 211/21 |
| 614,432 | 11/1898 | Austin | 211/20 X |
| 1,835,840 | 12/1931 | Barclay | 296/65 R |
| 2,303,618 | 12/1942 | Couleur | 296/19 |
| 2,391,074 | 12/1945 | Schnell | 188/75 |
| 2,558,056 | 6/1951 | Mitchell | 296/19 |

*Primary Examiner*—George E. A. Halvosa
*Attorney, Agent, or Firm*—Clarence A. O'Brien; Harvey B. Jacobson

[57] ABSTRACT

A fixture attached to the floor of a vehicle for restraining and securely holding a wheelchair and its occupant while the vehicle is in motion. The fixture comprises a framework to which is secured upper and lower clamping jaws which act to grip the propulsion wheels of the wheelchair and which are actuated by a manually controlled air cylinder or equivalent vacuum or hydraulic cylinder.

7 Claims, 4 Drawing Figures

WHEELCHAIR HOLDING DEVICE FOR VEHICLES

BACKGROUND OF THE INVENTION

1. Field of the Invention

Panel trucks, vans and buses are particularly suitable for transporting wheelchair bound persons, inasmuch as they can be modified to provide wider door access and entrance platforms so that the person in a chair may propel himself into the vehicle. Vans further provide more floor space, as they are freer of fixed seating.

It is necessary in transporting wheelchair bound persons, that special consideration be given to positively locking the chairs against inertial movement caused by changes in vehicular velocity.

The present arrangement discloses locking means for wheelchairs against movement within a vehicle without modifying the wheelchair in anyway.

2. Description of the Prior Art

The U.S. Pat. No. 3,752,265 to Lyder discloses a vertical shaft attached to the wheelchair and adapted to be threaded into a socket on the floor of the vehicle.

The patent to Mitchell U.S. Pat No. 2,558,056 discloses a slotted raised platform to which is secured a rack member having hook members to engage the wheels of a cot in an ambulance.

In the present invention, the locking means is carried solely by the vehicle and does not provide an encumbrance to the wheelchair in normal use as it might in Lyder. Further, it allows the user to be self-sufficient which is obviously not the case in Mitchell.

SUMMARY OF THE INVENTION

The object of the present invention is not only to positively secure the wheelchair within the vehicle, but to make it possible for the occupant of the chair or the driver to readily secure the chair in its locked position with little effort requiring no particular dexterity or manual strength. Conversely, the wheelchair may be released as quickly and as effortlessly. The present device allows the occupant of the wheelchair to achieve a greater degree of self-sufficiency with regard to vehicular transportation.

The construction of the device which surrounds the wheelchair on three sides is designed to provide a sense of security and comfort to the occupant. The framework construction may additionally be used for support of the occupant when rising from the chair when that is feasible. The device is of simple inexpensive construction and can be installed during manufacture or afterward. The device can be easily relocated, if necessary.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
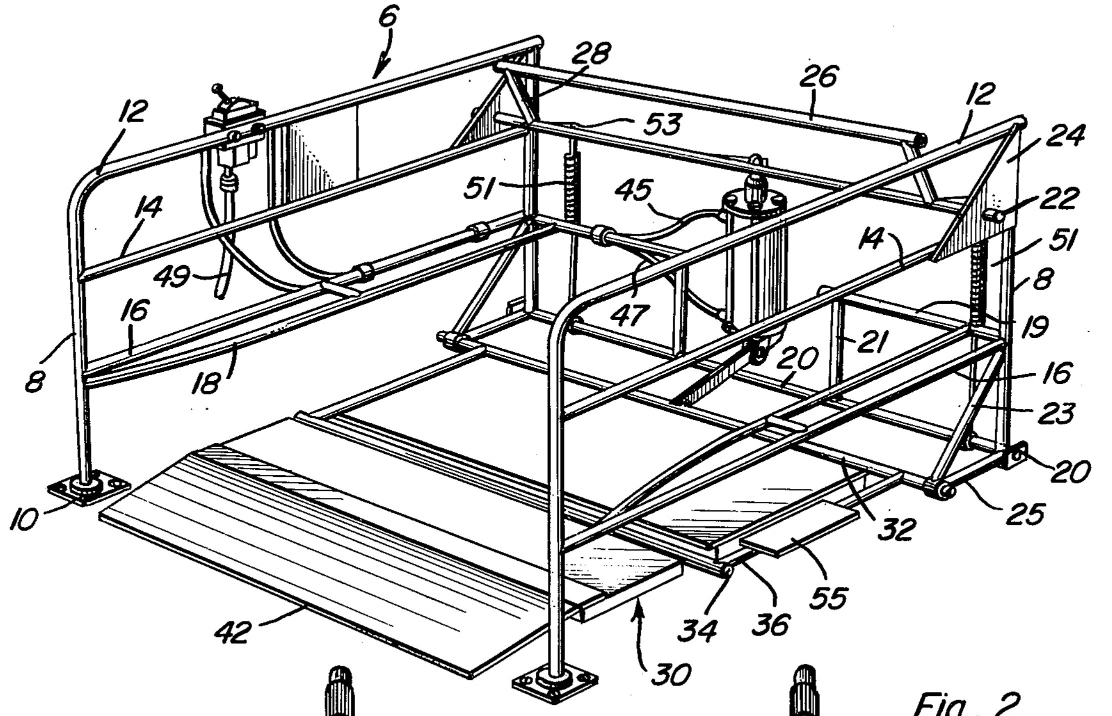
FIG. 1 is an over-all view of the device.
Figure 2:
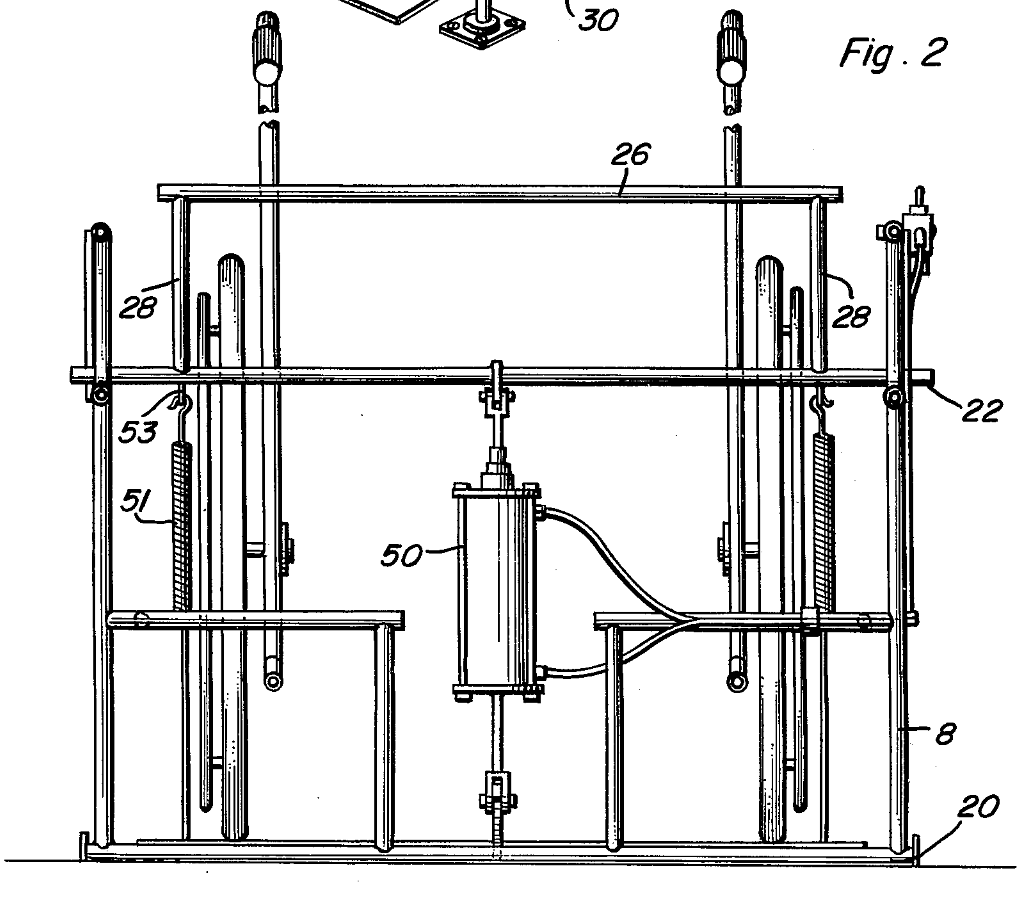
FIG. 2 is a view of the device as seen from the rear.

In FIG. 1, the device shown discloses an upwardly extending U-shaped rigid framework which may be of tubular steel construction, and is generally designated as 6 having a floor base plate generally designated as 30. The framework comprises four vertical posts 8 attached to the vehicle floor as at 10. The forward posts 8 are rounded off at the top to provide handgrips. A series of horizontal parallel bars 12, 14, 16 extend between the front and rear posts 8 to form the side section supports. The rear portion of the U-shaped frame has a bar 20 at floor plate level rigidly secured between the rear posts 8. A pair of struts 19, 21 are attached to rear posts 8 and bar 20 for additional support and to provide an end stop for the wheelchair. The struts 19, 21 are open in the middle to accommodate an air piston 50. A pair of angled struts 23, 25 are attached to the rear posts 8 at floor level. A pair of triangular plates 24 are attached to bar 14 and rear post 8 at the junction thereof. A rod 22 is pivotally mounted at each end in the plate 24. The pivoted rod 22 carries the upper clamping jaw 26 which is spaced forwardly of and parallel to the pivot rod by arms 28. There is a second pivot rod 32 spaced forwardly of and parallel to rod 20 at floor plate level. This pivot rod 32 is journaled in bearings provided at the apex of the angled struts 23, 25. The lower clamping jaw 34 is rigidly attached to pivot rod 32 by connecting arms 36. In the open position of the clamping jaw members 34, 36 lie in the plane of the floor base and forwardly of the pivot rod 32, with clamping jaw 34 lying in a recess provided in base 30. It should be noted that lower clamping jaw 34 lies forwardly of upper clamping jaw 26.

An upper crank arm 38 is rigidly attached to upper pivot rod 22 at a medial portion thereof. Similarly, a lower crank arm 40 is rigidly attached to lower pivot rod 32 at a medial portion, see FIG. 3.

The air piston 50 is pivotally mounted at pivot points 41, 43 on the upper and lower crank arms respectively to float therebetween at a location midway the pair of struts 19, 21. A pair of air hoses 45, 47 are connected to the upper and lower portions of the piston to supply operational pressure. The air hoses run to a manually operated control valve 60 attached to bar 12 of the side section to be within convenient reach of the wheelchair's occupant. Hose 49 feeds air from a conventional air supply (not shown) to the control valve 60.

A pair of springs 51 acting between bar 20 and crank arms 53 bias the clamping jaws 26 and 34 toward the open position.

A foot pedal 55 attached to arm 36 may be used when needed to floor clamping jaw 34.

The forward portion of the floor plate has a ramp designated as 42 in FIG. 1, which allows the wheelchair to roll into the framework enclosure without being lifted. Rail members 18 are attached to the side framework at the level of bar 16 and converge for a distance to center and guide the chair generally designated as 80 toward the rear of the framework enclosure and engagement of the rear propulsion wheels 81 with the upper and lower clamping jaws.

Figure 3:
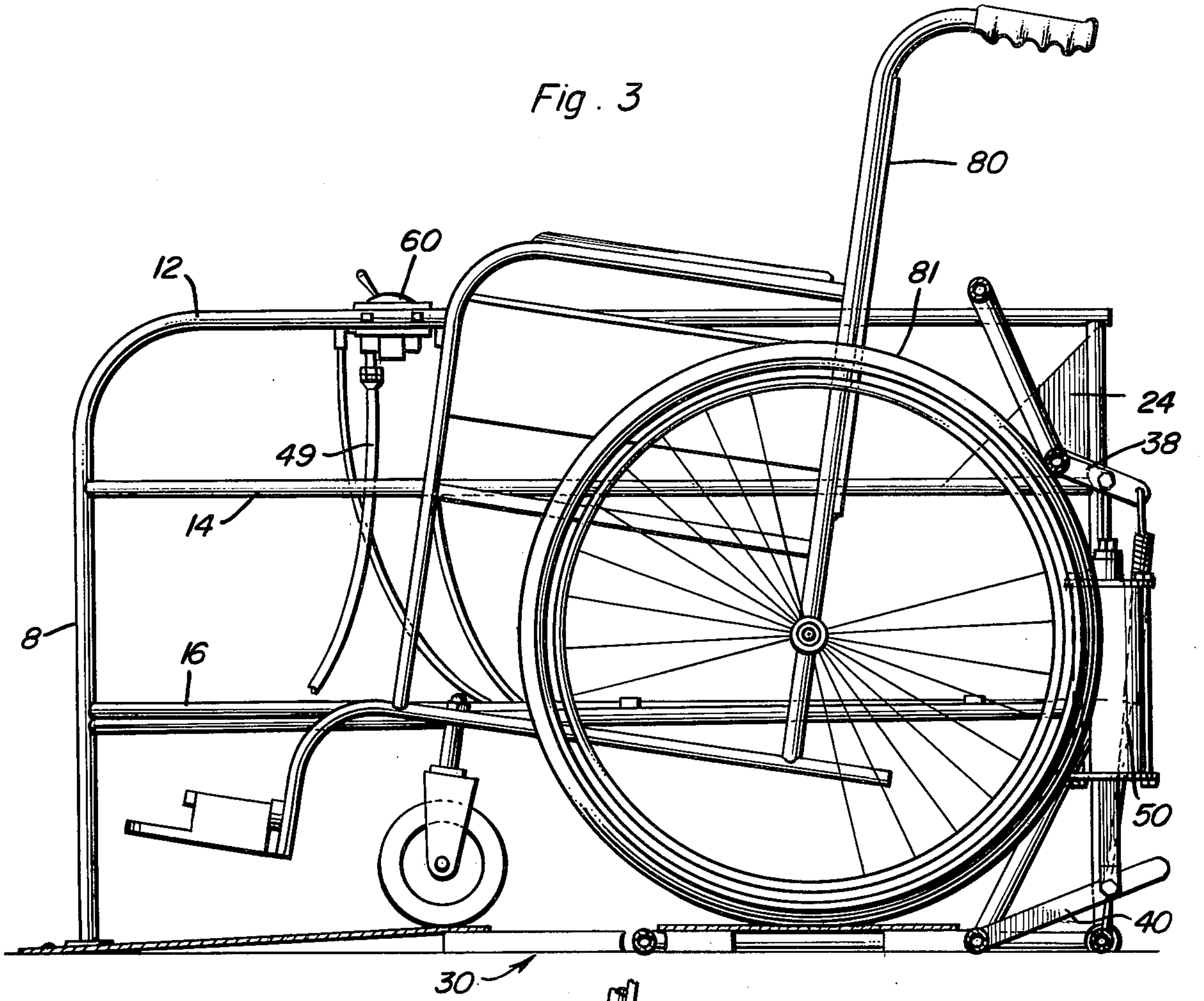
FIG. 3 is a side view of the device with the wheelchair in place and the clamping jaws open.
Figure 4:
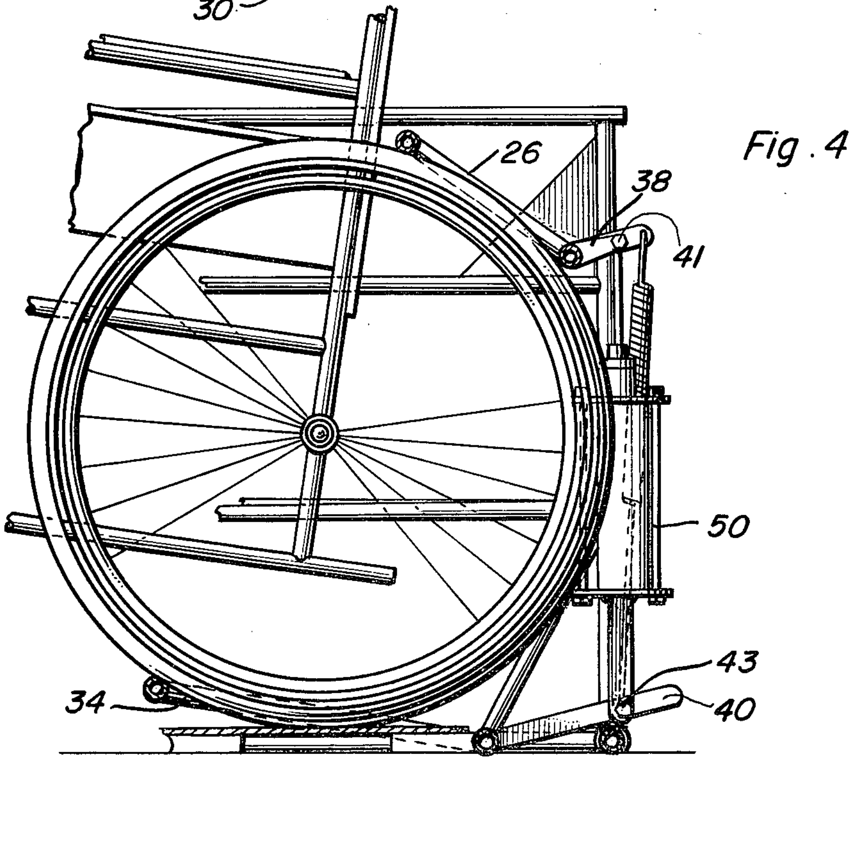
FIG. 4 is a partial side view of the device and shows the upper and lower clamping jaws gripping the driving wheel of the wheelchair.

In operation, referring to FIGS. 3 and 4, the wheelchair is backed up the ramp 42 and is rearwardly guided by centering rails 18 to come to rest against the back framework struts 19, 21. The clamping jaws 26, 34 are in the normally open position as shown in FIG.

3 with piston 50 in its contracted position. The operation of valve 60 sends high pressure air into the bottom of piston 50 causing extension thereof as shown in FIG. 4. Extension of the piston between pivot points 41, 43 rocks crank arms 38, 40 causing attached clamping jaws 26, 34 respectively to grip the propulsion wheels 81. Stated otherwise, the extension of piston 50 will cause the upper crank arm 38 to rotate the clamping jaw 26 and grippingly engage the rear upper portion of the propulsion wheels 81. At the same time, lower crank arm 40 will cause lower clamping jaw 34 to rotate upwardly and engage the lower front portion of the wheels as shown in FIG. 4. The clamping action of these two opposing jaws will accommodate a wide range of wheel sizes. It should be noted that the clamping jaws engage on opposed circumferential portions of the wheels and a line through these points passes to the opposite side of the center of the wheelchair wheel from the pivot point of the clamping jaws. This principle forces the wheelchair wheels toward the rear of the framework and secures it in that position.

To release the wheelchair, the valve 60 is reversed, shifting the pressure and causing the air piston to retract and release the jaws as shown in FIG. 3. Although a manually operated valve is shown, those skilled in the art will recognize that many conventional electrically operated air valves are available to operate the air piston 50. A remotely mounted valve or control can be used to control the cylinder. This allows the driver or others to work the holding device.

Actuating power sources other than an air cylinder, as for example, vacuum or hydraulic cylinders can be used to operate the clamping jaws.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fixture for restraining the motion of a wheelchair while it is being transported on a vehicle body, comprising means to enable an occupant of the wheelchair to readily secure the chair in a locked position including, a U-shaped rigid framework enclosure independent of the vehicle body, open at the front end, and having a pair of side support members and a rear support member adapted to be mounted on the floor of the vehicle, the open front end facing in a direction to receive a wheelchair with the propulsion wheels thereof adjacent said rear support member, means easily operable by the wheelchair occupant to hold the propulsion wheels in fixed position including a pair of spaced clamping jaws mounted on said framework moveable between an open position wherein said wheels are free, and a closed position wherein the jaws move toward one another to engage the wheels at opposed circumferential portions of the wheels, one of said jaws engaging the upper rear portion of the wheel, and the other jaw engaging the lower forward portion of the wheel to grip the wheel therebetween, and means for actuating the clamping jaws mounted on the framework.

2. A fixture as claims in claim 1 in which the means for actuating the clamping jaws comprises an air piston pivotally connected to crank arms which effectuate movement of the clamping jaws.

3. A fixture as claimed in claim 2 in which a further means monitors the air supply to the piston.

4. A fixture as claimed in claim 3 in which the further means comprises a manually operated valve mounted on the side support member within convenient reach of the wheelchair occupant and connected to an air supply, and having air hoses running to the piston.

5. A fixture as claimed in claim 1 wherein the framework is provided with a floor base having a ramp at its forward portion to facilitate entree of the wheelchair.

6. A fixture as claimed in claim 1, wherein the framework is made of rigid spaced tubular members and is provided with centering rails to guide the chair toward the rear end support position.

7. A fixture for restraining the motion of a wheelchair while it is being transported, comprising a U-shaped rigid framework enclosure, open at the front end, and having a pair of side support members and a rear support member adapted to be mounted on the floor of a vehicle, the open front end facing in a direction to receive a wheelchair with the propulsion wheels thereof adjacent said rear support members, means to hold the propulsion wheels in fixed position which are mounted on the frame work, said means comprising a pair of spaced clamping jaws which are moveable between an open position wherein said wheels are free, and a closed position wherein the jaws move toward one another to engage the wheels at opposed circumferential portions of the wheels, in which one jaw engages the upper rear portion of the wheel, and the other jaw the lower forward portion of the wheel to grip the wheel therebetween, wherein one jaw is mounted for pivotal movement on the rear upper portion of the framework, and the second jaw is pivotally mounted on the framework forwardly of the first jaw and at floor level, so as to accommodate a wide range of wheel sizes, and a line through the said points of jaw engagement with the wheel, passes to the opposite side of the center of the wheel from the pivot points of the clamping jaws to force the chair to the rear of the framework and secure it there, and further wherein both jaws extend across the framework from one side to the other, so as to accommodate a wide range of chair widths.

* * * * *